(12) United States Patent
Hess

(10) Patent No.: US 8,899,146 B2
(45) Date of Patent: Dec. 2, 2014

(54) APPARATUS FOR COOKING A FOOD ITEM BY REFLECTING AND TRAPPING THERMAL ENERGY AND SIMULTANEOUS ACCELLERATED BUN COOKING

(75) Inventor: Hans Karl Hess, Arlington, VA (US)

(73) Assignee: EBIP Holdings, LLC, Arlington, VA (US)

( * ) Notice: Subject to any disclaimer, the term of this patent is extended or adjusted under 35 U.S.C. 154(b) by 652 days.

(21) Appl. No.: 12/942,921

(22) Filed: Nov. 9, 2010

(65) Prior Publication Data

US 2011/0107923 A1 May 12, 2011

Related U.S. Application Data

(60) Provisional application No. 61/259,752, filed on Nov. 10, 2009.

(51) Int. Cl.
*A47J 37/06* (2006.01)
*A47J 37/08* (2006.01)

(52) U.S. Cl.
CPC .................... *A47J 37/0635* (2013.01)
USPC .......................................... 99/422

(58) Field of Classification Search
USPC ........... 99/422, 424, 423, 427, 447, 448, 449, 99/349
See application file for complete search history.

(56) References Cited

U.S. PATENT DOCUMENTS

| 992,417 | A | * | 5/1911 | Gale | 99/379 |
| 3,418,920 | A | * | 12/1968 | Alexander | 99/386 |
| 3,463,076 | A | * | 8/1969 | Keating | 99/349 |
| 3,948,159 | A | * | 4/1976 | Vigerstrom | 99/358 |
| 4,724,823 | A | * | 2/1988 | Simpson | 126/39 R |
| 6,818,868 | B2 | * | 11/2004 | Grohs | 219/450.1 |
| 2006/0162575 | A1 | * | 7/2006 | Lee | 99/450 |

* cited by examiner

*Primary Examiner* — Henry Yuen
*Assistant Examiner* — John J Norton
(74) *Attorney, Agent, or Firm* — White-Welker & Welker, LLC; Matthew T. Welker, Esq.

(57) ABSTRACT

An apparatus for cooking ground beef hamburgers by reflecting and trapping thermal energy and simultaneous accelerated bun cooking. The apparatus comprised of a plate that is hinged to the sidewall of the griddle for the simultaneous cooking of both sides of ground beef and buns on both sides. Once meat is placed in a first cooking area, the plates on the hinge are rotated down and come to rest on the meat, applying slight pressure to the meat. Plates are attached to the side wall and to the rear wall. Modified plates are used to facilitate the rotation of a large wire frame that contains a metal chain mail fabric into a second cooking area. When buns are placed in the second cooking area, the chain mail frame is brought down onto the outer sides of the buns, putting weight on the buns and accelerating their cooking time.

10 Claims, 8 Drawing Sheets

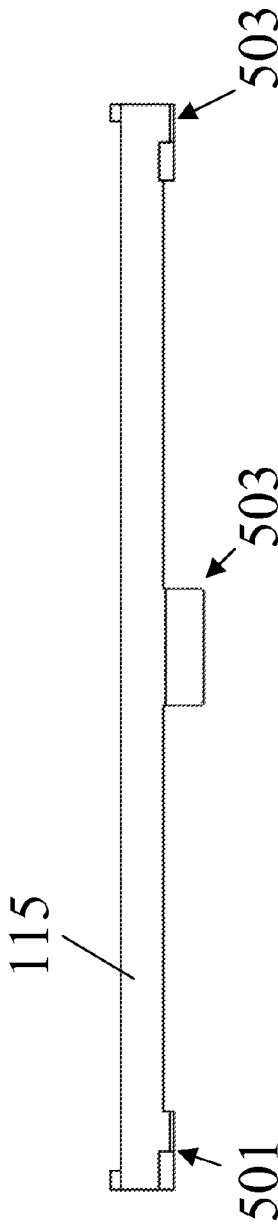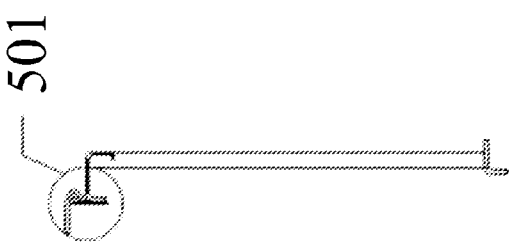

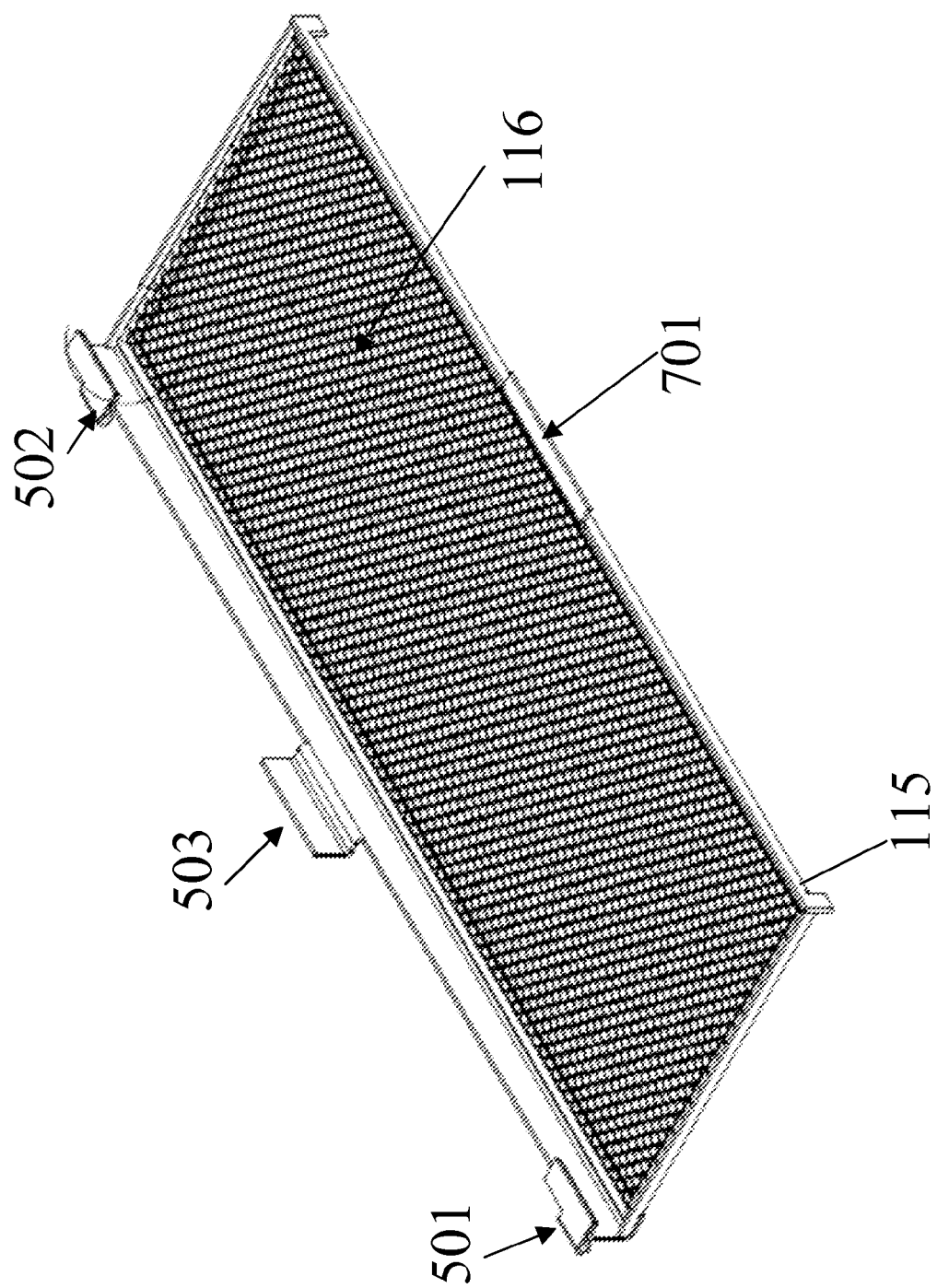

APPARATUS FOR COOKING A FOOD ITEM BY REFLECTING AND TRAPPING THERMAL ENERGY AND SIMULTANEOUS ACCELLERATED BUN COOKING

CROSS REFERENCE TO RELATED APPLICATIONS

This application claims priority from U.S. Patent Application Ser. No. 61/259,752, entitled "An apparatus and method of cooking ground beef (hamburgers) by reflecting and trapping thermal energy and simultaneous accelerated bun cooking", filed on 10 Nov. 2009. The benefit under 35 USC §119 (e) of the United States provisional application is hereby claimed, and the aforementioned application is hereby incorporated herein by reference

FEDERALLY SPONSORED RESEARCH

Not Applicable

SEQUENCE LISTING OR PROGRAM

Not Applicable

TECHNICAL FIELD OF THE INVENTION

The present invention relates generally to generally to cooking griddles, grills and like devices. More specifically, the present invention relates to an apparatus for effecting two-sided cooking of meat patties, buns, and other food like products that has been configured for efficient and consistent food preparation and versatile use.

BACKGROUND OF THE INVENTION

In the commercial food service industry, efficiency and consistency in the preparation of food products are highly desired goals. Efficient preparation lends to customer satisfaction since customers can quickly be served freshly prepared food products. Customer satisfaction is further enhanced by food preparation techniques that lend themselves to convenient control, since customers can be assured of receiving food products of consistent quality. Normally meat is cooked on a griddle by one side at a time. For example, this is the normal way to cook ground beef patties.

One technique for enhancing the efficiency with which food products are prepared concerns heating or cooking the products from two sides simultaneously. In the case of ground meat patties such as hamburgers, such two-sided cooking techniques have been found to very substantially decrease the cooking time required when compared with more conventional single-sided grilling or broiling.

For example, U.S. Pat. No. 5,555,794 teaches an adjustable hinge apparatus for use with a cooker having multiple stacked heating plates and a support pin extending across one side of the cooker to form a common pivot axis. The hinge apparatus includes an array of adjustable hinges formed to be positioned adjacent one another on the support pin. Each hinge includes a hinge block having a pivot aperture sized for sliding movement of the support pin therein and an arm extending away from the hinge block. The arms of adjacent hinges are formed for attachment with consecutively stacked heating plates and the hinge block of each hinge is formed to slide on the support pin perpendicular to the pivot axis and independently of adjacent hinges. Thus, the hinging apparatus permits variable spacing and free floating vertical movement between heating plates, and prevents relative horizontal movement between the plates by maintaining a common pivot point for all plates in the various positions. One shortcoming with the apparatus taught by U.S. Pat. No. 5,555,794 is the multiple staked heating plates that make it very difficult for use in tight cooking spaces and a complex arrangement of heated surfaces for the operator.

U.S. Pat. RE32994 teaches an improved clamshell type grill apparatus which effectively accommodates variation in initial thickness of the individual patties of the group being cooked; accommodates a decrease in thickness of the patties that occurs during cooking; accommodates different groups of patties of nominally different thickness; and is adapted to raise the upper end of a timed cooking cycle to stop cooking by the upper platen and enable removal of the cooked products from the lower platen. The shortcoming with the apparatus taught by U.S. Pat. RE32994 is that it does not provide a self-contained apparatus for efficiently and consistently delivering a cooked ground beef patty and bun in a commercial setting.

The attempts to perfect commercially suitable two-sided cooking devices as those found in the prior art, such as for cooking frozen meat patties and pizza, have only reached limited success. In particular, the greatly accelerated cooking achieved with two-sided techniques has been found to greatly affect the criticality of the usual cooking parameters, such as cooking temperatures, cooking times, and the like. Accordingly, the consistency of preparation required by commercial restaurant establishments has heretofore been difficult to achieve when employing two-sided cooking techniques.

Thus, in order to take full advantage of the substantially reduced cooking times that can be achieved with two-sided cooking, a two-sided cooking apparatus must be configured for preparing foods in a consistent and predictable manner. Configuring such an apparatus for use in preparing different or complimentary food products such as hamburger and bun enhances its versatility. Finally, an arrangement that permits its cooking capacities to be selectively varied as the volume of business may require enhances both the efficiency and versatility of such a device.

SUMMARY OF THE INVENTION

The present invention is an apparatus and method of cooking ground beef hamburgers by reflecting and trapping thermal energy and simultaneous accelerated bun cooking. The apparatus and method of the present invention involves a plate that is hinged to the sidewall of the griddle for the simultaneous cooking of both sides of ground beef and buns on both sides. Once meat is placed in the target zone, the plates on the hinge are rotated down and come to rest on the meat, applying slight pressure to the meat. There are two types of plates, ones that are attached to the side-wall and ones that attach to the rear wall. The invention is related to prior art known as a "clamshell" but is much different since the clamshells taught and know in the prior art are tech the use of heated elements on top and bottom.

The present invention is a thermal trap that utilizes reflected and trapped thermal energy coming from the bottom griddle surface to cook the burger faster. The burger still has to be flipped over but cooking time is reduced to about 50% of the time it took under the normal method.

Which respect to the bun cooking the apparatus of the present invention use an essentially identical mechanism. The present invention uses a variation of the plates utilized for cooking the ground beef. In this case though, the modified plates are used to facilitate the rotation of a large wire frame (about 10" across and 28" long) that contains a metal chain mail fabric. When buns are placed on the surface of the grill, the chain mail frame is brought down onto the outer sides of the buns, thus putting weight on the buns and accelerating their cooking time.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

FIGS. 5a and 5b are side views of the chain mail and frame of the present invention;

FIGS. 7a and 7b are perspective views of the chain mail and frame of the present invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
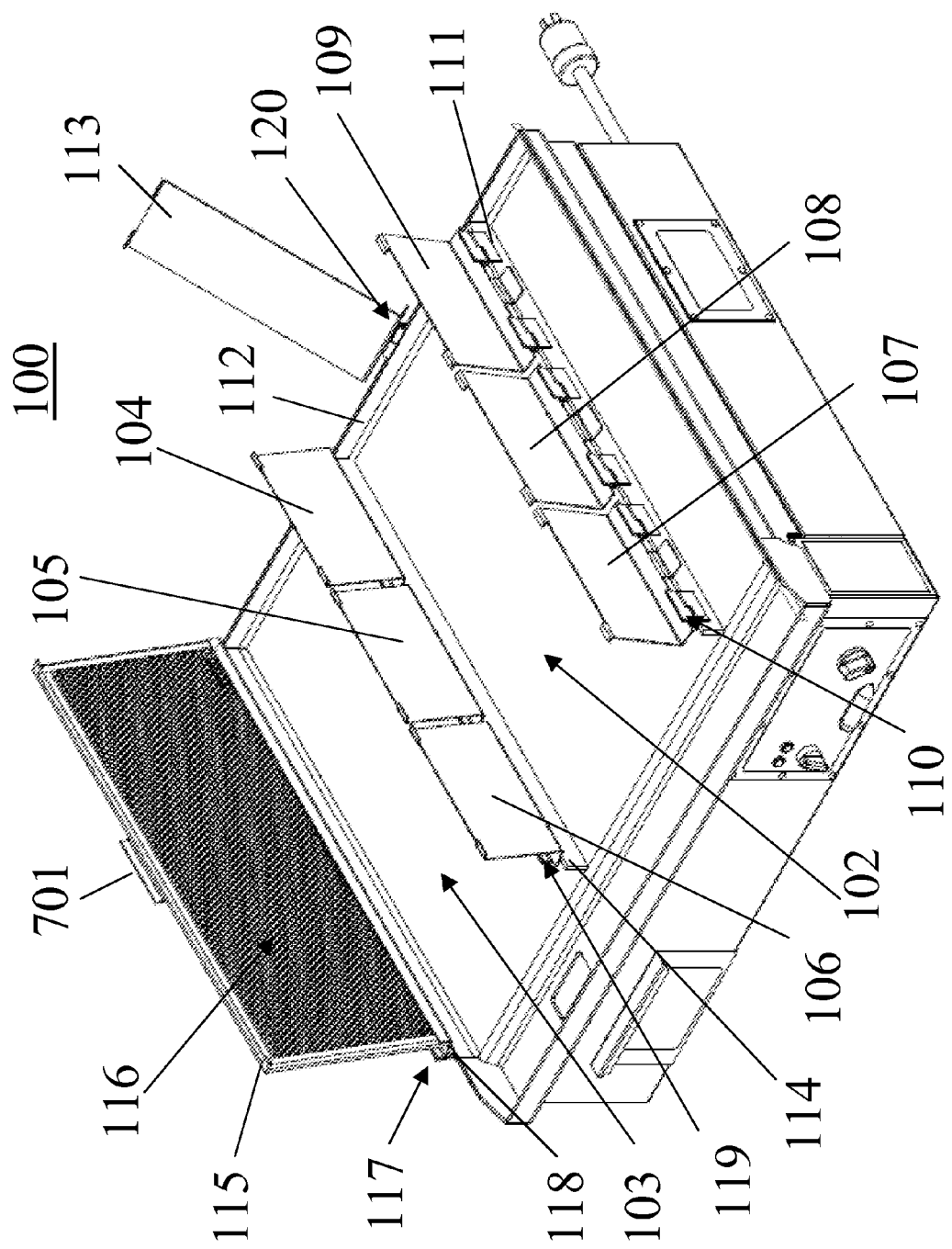
FIG. 1 is a perspective view of the apparatus of the present invention in an open position.

Now referring to the Figures, the apparatus of the present invention for cooking ground beef, buns, and other food products is illustrated. FIG. 1 illustrates the apparatus of the present invention that is comprised of a grilling or griddle surface 101 with a plurality of cooking areas 102 and 103. In a preferred embodiment, there are two main cooking areas 102 and 103, a first cooking area 102 for cooking ground beef or other food items and a second cooking area 103 for cooking or toasting buns that are used in combination with the cooking ground beef or other food items from the first cooking area 102.

Figure 2:
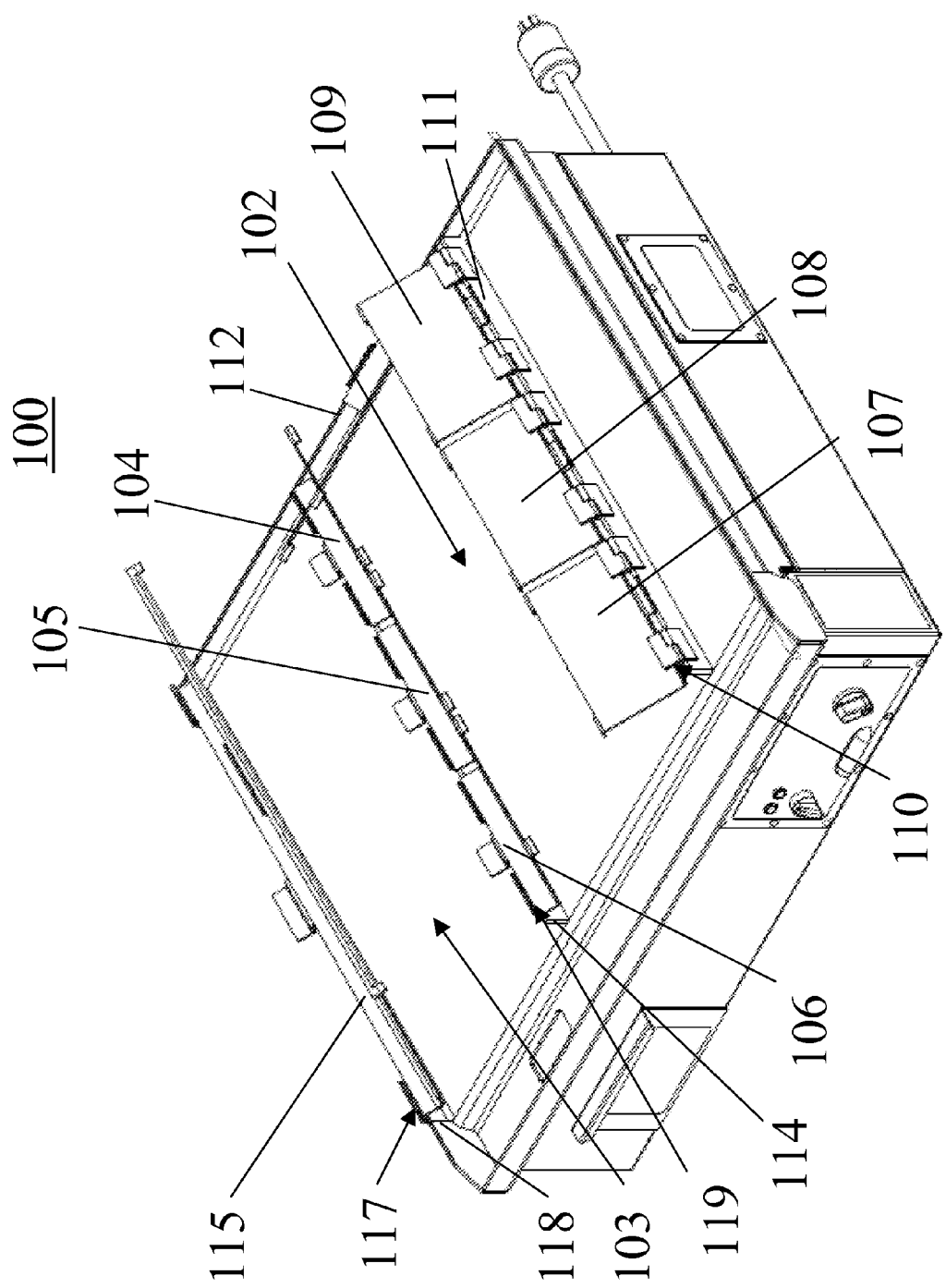
FIG. 2 is a perspective view of the apparatus of the present invention in an partially open position.
Figure 3:
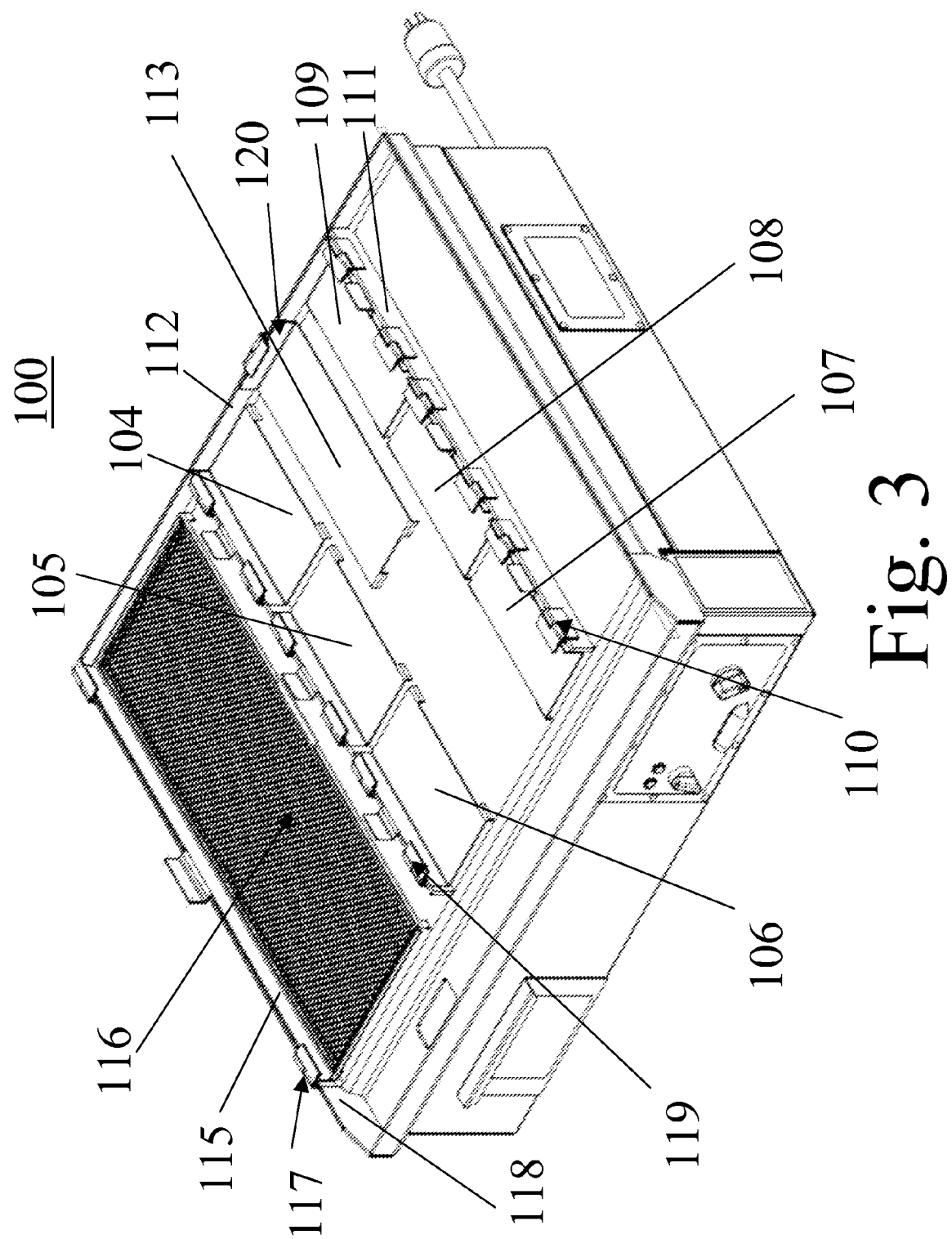
FIG. 3 is a perspective view of the apparatus of the present invention in a closed cooking position.

The first cooking area 102 is further comprise of a plurality of cooking plates 104, 105, 106, 107, 108, and 109 that are rotatably attached to the grill or griddle 100 to define a first cooking surface 102. The cooking plates 104, 105, 106, 107, 108, and 109 are hinged 110 and 119 to the sidewall 111 and dividing wall 114 respectively of the griddle 100 for the simultaneous cooking of both sides of ground beef or other food items on both sides. Once meat or another food item is placed in the target zone or first cooking area 102, the cooking plates 104, 105, 106, 107, 108, and 109 on the hinge 110 are rotated from an open position to a closed position wherein the cooking plates 104, 105, 106, 107, 108, and 109 rest on the first cooking area 102, applying slight pressure to a first cooking item in the first cooking area as shown in FIG. 2 and come to rest on the meat or other food item, applying slight pressure to the meat or other food item as shown in FIG. 3. There are two types of plates, ones that are attached to the side-wall 111 and dividing wall 114 and cooking plates 113 that attach to the rear wall 112 of the grill or griddle 100 by yet another hinge 120.

The second cooking area 103 is further comprised of a single frame 115 that is attached to a sheet of chain mail 116. The chain mail 116 and frame 115 is attached to the grill or griddle 100 to define a second cooking surface 103. The chain mail frame 115 is hinged by a second hinge 117 to the second sidewall 118 of the grill or griddle 100 for the simultaneous cooking of both sides of a bun or second food item. Once a bun or second food item is placed in the second cooking area 103, the chain mail 116 and frame 115 on the second hinge 117 is rotated from an open position to a closed position wherein the frame and attached chain mail rest on the second cooking area as shown in FIG. 2 and comes to rest on the bun or second food item, the chain mail 116 then applies slight pressure to the bun as shown in FIG. 3.

In alternative embodiments, the chain mail 116 may be replaced by solid steel plate, a steel plate with a matrix of holes providing a pressure to the bun or other food item being cooked.

When the cooking plates 104, 105, 106, 107, 108, and 109 or the chain mesh frame 115 are placed or rotated down on the food item to be cooked, a thermal trap is created that utilizes reflected and trapped thermal energy coming from the bottom griddle surface of the first cooking area 102 or the second cooking area 103 to cook the burger, bun, or other food item faster. In a the first cooking area 102 of a preferred embodiment of the present invention, the ground beef still has to be flipped over but cooking time is reduced to about 35% of the time it would take to cook under the normal method of cooking on an open grill.

Figure 4:
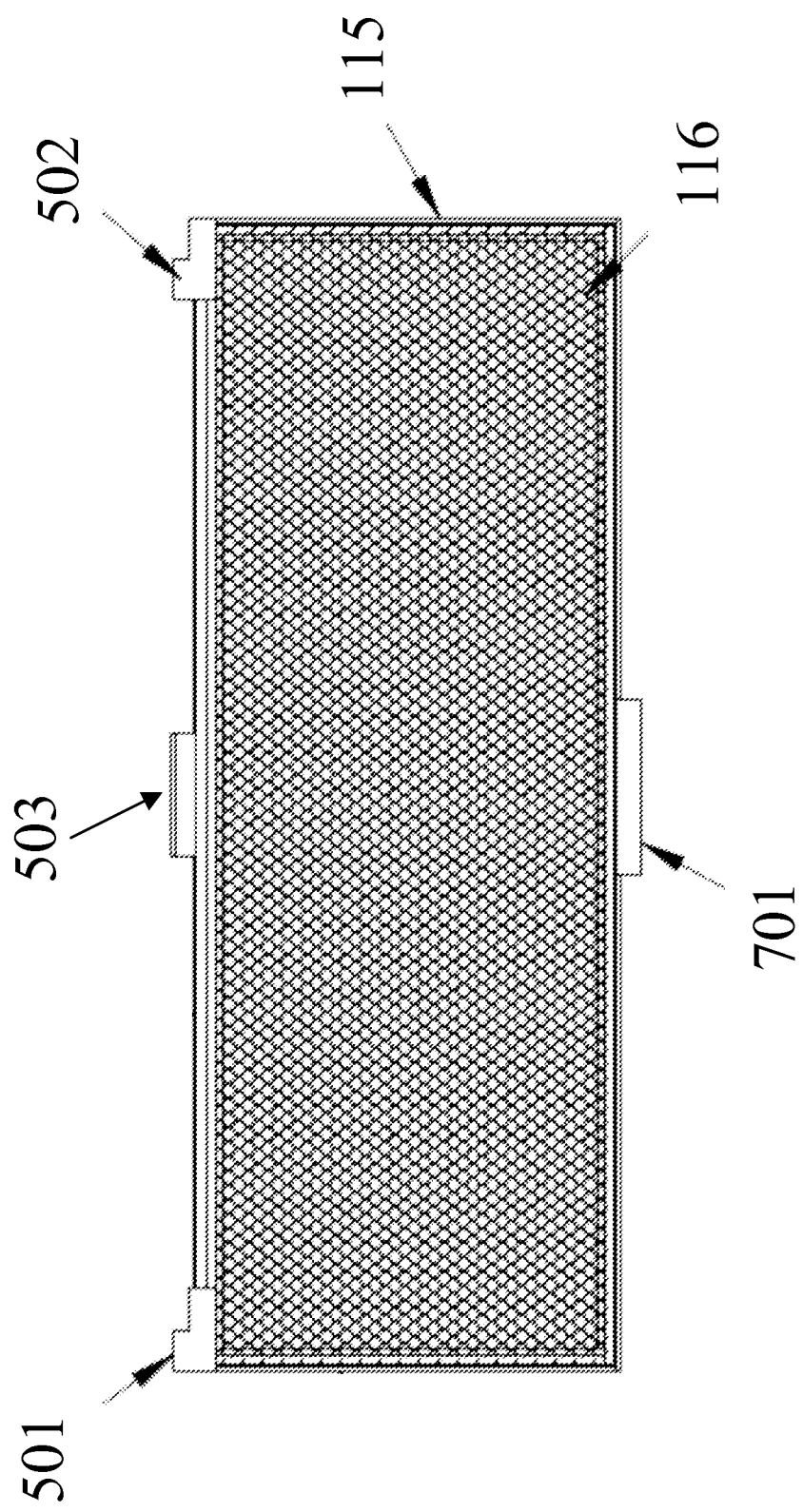
FIG. 4 is a top view of the chain mail and frame of the present invention.

Which respect to the second cooking area 103, in a preferred embodiment, the bun cooking portion of the apparatus of the present invention use an essentially identical mechanism. The present invention uses a variation of the cooking plates 104, 105, 106, 107, 108, and 109 utilized for cooking the ground beef. In this case though, the modified plates are used to facilitate the rotation of a large wire frame 115 (about 10" across and 28" long) that contains a metal chain mail fabric 116 as shown in FIG. 4. When buns are placed on the surface of the grill in the second cooking area 103, the chain mail frame 115 and chain mail 116 is brought down onto the outer sides of the buns, thus putting weight on the buns and accelerating their cooking time. A smaller thermal trap is created by the chain mail 116 that utilizes reflected and trapped thermal energy coming from the bottom griddle surface of the second cooking area 103 to cook the burger, bun, or other food item faster. Variations of the chain mail 116 or other surfaces such as a solid metal plate or a metal plate further comprised of a series of holes or a matrix of holes can be used to vary the product being cooked as desired.

Figure 6:
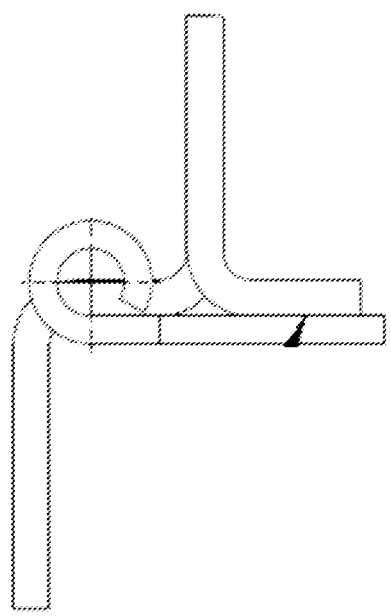
FIG. 6 is a side view of the hinges used for the chain mail and frame of the present invention.

Referring to FIGS. 5a and 5b the chain metal frame 115 is shown in a side view illustrating the plurality of hinges 501, 502, 503 for connecting the chain metal frame 115 to the grill or griddle side wall 117. FIGS. 5b and 6 illustrate the hinge placement and design of the hinges 501, 502, 503 of the chain metal frame 115 used by the present invention. In this embodiment, the hinges 501, 502, 503 are welded to the frame 115, but designed to allow lifting off removal of the chain metal frame 115 for easier replacement, service, and cleaning.

Figure 7B:
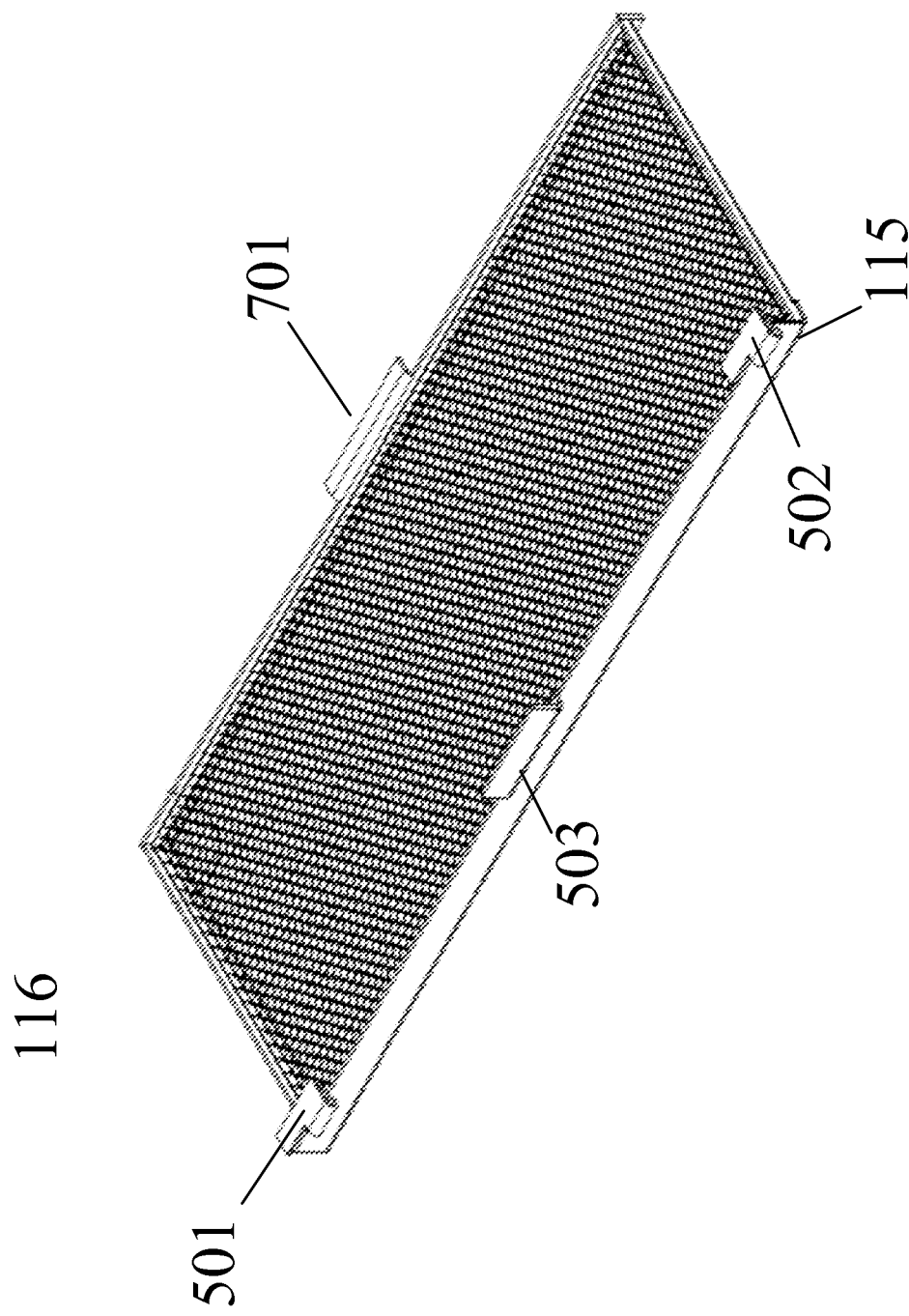

Now referring to FIGS. 7a and 7b, the chain mail frame 115 and chain mail screen 116 are shown. The chain mail frame 115 has a plurality of hinges 501, 502 that allows it to be connected to the side of the grill 117 or griddle cooking surface and rotate into place for cooking. There is also a handle 701 provided for the operator to drop and lift the frame into place as desired.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. An apparatus for simultaneously cooking one or more cooking items comprising:
    a grill surface with a plurality of cooking areas;
    a first cooking area for a first cooking item;
    a second cooking area for a second cooking item;
    the first cooking area is comprised of a plurality of cooking plates that are attached to the grill to define the first cooking area;
    the plates are secured to the grill by one or more attachment means that allow the plates to be rotated from an open plate position to a closed plate position wherein the plates rest on the first cooking area, applying slight pressure to the first cooking item in the first cooking area;
    the second cooking area is comprised of a single frame that is attached to a sheet of chain mail; and
    the frame is secured to the grill by one or more attachment means that allow the frame and the attached chain mail to be rotated from an open frame position to a closed frame position wherein the frame and the attached chain mail rest on the second cooking area, applying slight pressure to the second cooking item in the second cooking area; wherein
    the grill surface is divided into the first and second cooking areas;
    the first cooking area has a back wall, a first side wall and a dividing wall;
    the dividing wall divides the grill surface substantially into the first and second cooking areas; and
    the plurality of plates are secured to at least two walls among the back wall, first side wall and dividing wall.

2. The apparatus of claim 1, wherein there are two types of plates, a first type that are attached to the first side wall and a second type that are attached to the rear wall.

3. The apparatus in claim 1, wherein the first cooking item in the first cooking area is beef for a hamburger.

4. The apparatus in claim 1, wherein the second cooking item in the second cooking area is any kind of bread used as a bun.

5. The apparatus in claim 1, wherein the second cooking item in the second cooking area is a bun for use in combination with the first cooking item wherein the first cooking item in the first cooking area is beef for a hamburger.

6. The apparatus in claim 1, wherein
    the first cooking area is substantially rectangular in shape;
    some of the plurality of plates are secured to the dividing wall and the first side wall by one or more hinges that allow the plates to be rotated from the open plate position to the closed plate position;
    a single plate is secured to the rear wall by one or more hinges that allow the plate to be rotated from the open plate position to the closed plate position applying slight pressure to the first cooking item in the first cooking area, wherein the plate rests on the first cooking area between the plates secured to the first side wall and the dividing wall; and
    when the plates are rotated to the closed plate position, there is a portion of the first cooking area that remains uncovered.

7. The apparatus in claim 6, wherein the second cooking area is substantially rectangular in shape and is approximately the same size as the first cooking area.

8. The apparatus in claim 7, wherein
    the second cooking area is defined by a second side wall, the dividing wall shared with the first cooking area, and the rear wall; and
    the frame is secured to the second side wall by one or more hinges that allow the frame and the attached chain mail to be rotated from the open frame position to the closed frame position.

9. The apparatus in claim 1, wherein the plates are secured to the grill by one or more hinges.

10. The apparatus in claim 1, wherein the frame is secured to the grill by one or more hinges.

* * * * *